United States Patent [19]

Kurihara

[11] Patent Number: 4,840,522
[45] Date of Patent: Jun. 20, 1989

[54] SYNTHETIC RESIN RIVET

[75] Inventor: Kazumasa Kurihara, Yokohama, Japan

[73] Assignee: Nifco, Inc., Yokohama, Japan

[21] Appl. No.: 112,977

[22] Filed: Oct. 27, 1987

[30] Foreign Application Priority Data

Oct. 29, 1986 [JP] Japan .................. 61-164947

[51] Int. Cl.⁴ .............................................. F16B 13/06
[52] U.S. Cl. ...................................... 411/44; 411/903; 411/908
[58] Field of Search ............................. 411/15, 19-23, 411/40, 41, 44, 45, 50, 51, 56, 69, 71-73, 338, 339, 500, 501, 900-903, 907, 908

[56] References Cited

U.S. PATENT DOCUMENTS

| | | | |
|---|---|---|---|
| 2,562,721 | 7/1951 | Jakosky | 411/501 X |
| 2,849,201 | 8/1958 | Schelgunov | 411/44 X |
| 3,082,807 | 3/1963 | Tinnerman | 411/15 |
| 3,417,438 | 12/1968 | Schuplin | 411/41 X |
| 4,311,421 | 1/1982 | Okada et al. | 411/59 |
| 4,405,256 | 9/1983 | King | 411/69 X |
| 4,610,587 | 9/1986 | Wollar et al. | 411/60 |
| 4,674,257 | 6/1987 | Rose | 411/908 X |

FOREIGN PATENT DOCUMENTS

| | | | |
|---|---|---|---|
| 44-28336 | 11/1969 | Japan . | |
| 806962 | 1/1959 | United Kingdom | 411/908 |
| 884123 | 12/1961 | United Kingdom | 411/71 |

Primary Examiner—Gary L. Smith
Assistant Examiner—Douglas E. Ringel
Attorney, Agent, or Firm—Schwartz & Weinrieb

[57] ABSTRACT

A synthetic resin rivet comprises a rivet body having a hollow cylindrical portion and an integral flange portion extending radially outwardly from the upper end of the cylindrical portion and a pin for radially expanding the cylindrical portion of the rivet body when inserted thereinto. The rivet body has a double-layer structure constituted by two different synthetic resins, one relatively hard and the other relatively soft. At least an outer layer of the cylindrical portion and a cap layer closing an end opening of the cylindrical portion is fabricated from the soft synthetic resin so as to provide reliably effective annular sealing defined between the cylindrical portion of the rivet and the interior peripheral surfaces of the holes defined within panels within which the rivet is to be disposed. In addition, the cap portion is radially expanded so as to achieve plastic deformation and thereby prevent radial contraction of the soft resin cylindrical portion of the rivet which would otherwise degrade the effective sealing property thereof.

5 Claims, 3 Drawing Sheets

SYNTHETIC RESIN RIVET

BACKGROUND OF THE INVENTION

1. Field of the Invention

This invention relates to a synthetic resin rivet, which comprises a rivet body and a pin, the rivet body being adapted to increase in diameter with forced insertion of the pin thereinto.

2. Description of the Prior Art

FIG. 10 shows a well-known synthetic resin rivet 5 which comprises a rivet body 3 having a hollow cylindrical portion 1 and an integral disk-like flange portion 2 extending radially outwardly from the upper end of the cylindrical portion 1 and a cylindrical pin 4 for spreading the hollow cylindrical portion 1 of the rivet body 3 in the radially outward direction as it is inserted into the cylindrical portion 1. (Japanese Utility Model Publication No. Sho 44-28336)

In this prior art rivet 5, however, the rivet body 3 is formed as a one-piece molding of a resin having a comparatively high degree of hardness, such as, for example, nylon. Therefore, in order to insert the pin 4 into the cylindrical portion 1 of the rivet body 3, a very high insertion force is required, meaning that the operability of this rivet is rather inferior.

Furthermore, since the rivet body 3 has a high degree of hardness, its cylindrical portion 1 does not readily spread uniformly. Therefore, the sealing property of this rivet is inferior. Furthermore, the cylindrical portion 1 of the rivet body 3 and the end of the pin 4 are liable to crack when the pin 4 is inserted.

OBJECT OF THE INVENTION

An object of the invention is to provide a synthetic resin rivet which permits ready insertion of the pin into the cylindrical portion of the rivet body and can provide an excellent seal with respect to a mounting hole defined within a panel or panels within which the fastener or rivet of the invention is to be disposed.

SUMMARY OF THE INVENTION

To attain the above object of the invention, there is provided a rivet which comprises a rivet body having a two-layer structure constituted by means of relatively hard and soft resins. The rivet body has a cylindrical portion, which has an outer layer consisting of the soft resin and also has an end opening closed at least by means of the soft resin.

To fasten together two panels with the rivet according to the invention, holes formed within the two panels are aligned, the cylindrical portion of the rivet body is then inserted from the end through the aligned holes, and then the pin is forced into the cylindrical portion of the rivet. As a result, the cylindrical portion of the rivet body is spread in the radially outward direction within that portion thereof which is disposed beneath the lower one of the panels so as to clamp the panels in an overlapped state between such radially expanded portion and a flange portion of the rivet body. At this time, the soft resin outer layer of the cylindrical portion is held in close contact with the interior peripheral wall surfaces of the holes of the two panels so as to obtain a reliable sealing effect.

When the cylindrical portion of the rivet body is radially expanded, the soft resin dimpled portion closing the end opening of the cylindrical portion is expanded radially outwardly so as to undergo plastic deformation. Thus, subsequent contraction of the cylindrical portion is prevented.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENT

Figure 1:
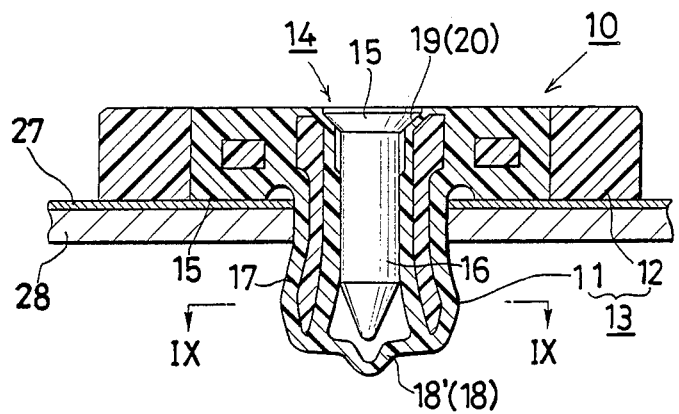
FIG. 1 is a sectional view showing a rivet according to the invention in a state of holding two panels fastened together.
Figure 2:
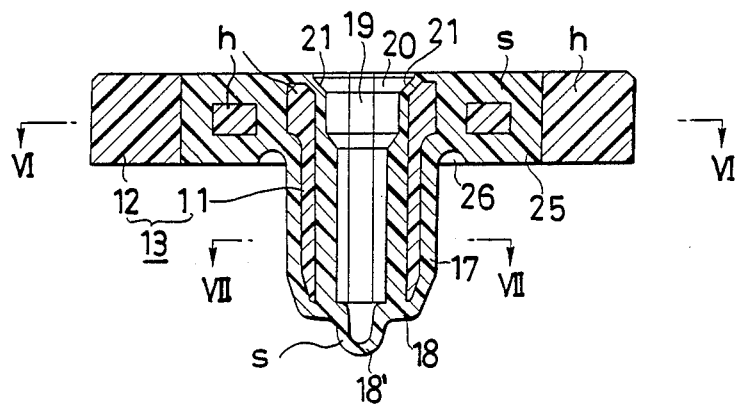
FIG. 2 is a sectional view showing the rivet body of the rivet.
Figure 3:
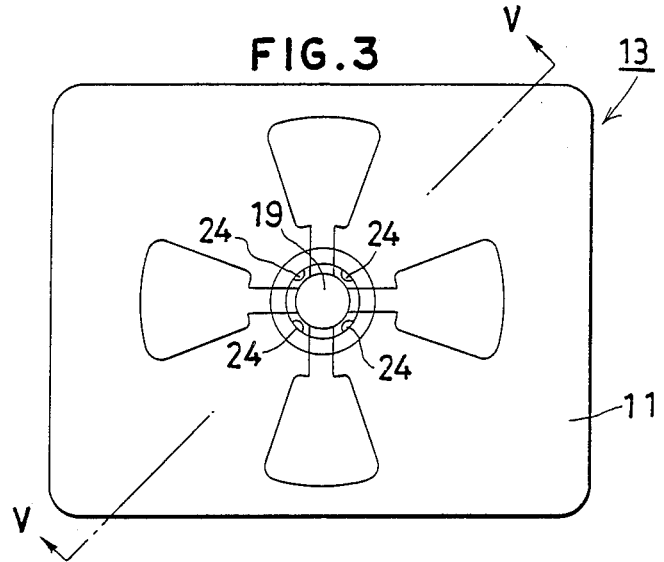
FIG. 3 is a plan view showing the rivet.
Figure 4:
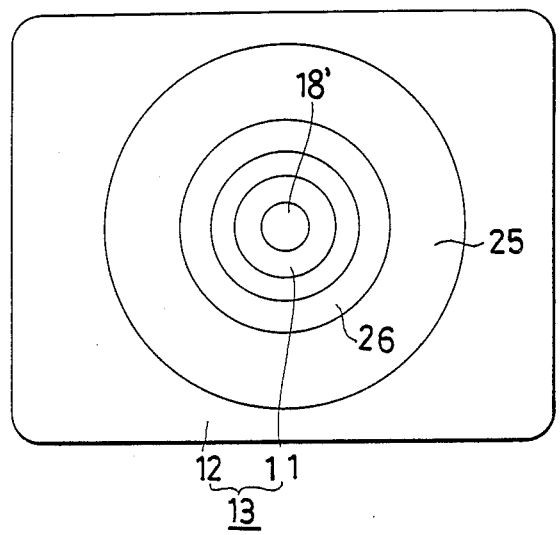
FIG. 4 is a bottom view showing the rivet.

FIGS. 1 to 9 illustrate an embodiment of the synthetic resin rivet according to the invention.

Referring to the figures, reference numeral 10 designates the rivet, which is used for fastening together, for instance, outer and inner door panels of an automobile.

Figure 8:
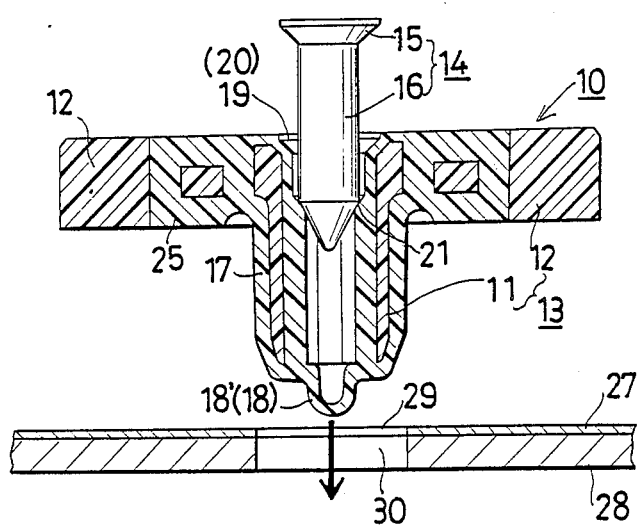
FIG. 8 is a sectional view showing the rivet body and a pin partially inserted therein.
Figure 10:
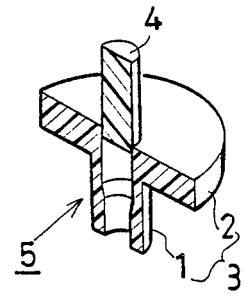
FIG. 10 is a perspective view showing a section of a prior art rivet.

The rivet 10 comprises a rivet body 13, which has a hollow cylindrical portion 11 and a rectangular flange portion 12 extending radially outwardly from the upper end of the cylindrical portion 11, and a pin 14 for expanding the cylindrical portion 11 in the radially outward direction. The rivet body 13 and pin 14 are formed as respective synthetic resin moldings. The pin 14, as shown in FIGS. 1 and 8, has a disk-like head portion 15 and a cylindrical shaft portion 16 depending from the central portion of the bottom surface of the head portion 15. In this embodiment, the pin 14 is formed as a one-piece molding of a soft resin, and its end portion is tapered in order to facilitate insertion of the same into the cylidrical portion 11 of the rivet body 13.

As shown in FIGS. 2 to 7, the rivet body 13 has a double-layer structure. It is made of a relatively hard resin material h and a relatively soft resin material s. As the hard resin material, there may be used nylon, polyacetal or polypropylene for instance. The soft resin material should have a relative degree of hardness similar to that of rubber, and may, for example, be polyurethane.

The rivet body 13 may be formed, for example, by first molding the hard resin portion thereof, placing the so-formed member at an appropriate location within a mold, and then injecting fused soft resin material into the mold.

The cylindrical portion 11 has an outer layer 17 comprising the soft resin. The end opening of the cylindrical portion 11 is closed by means of the soft resin material. In particular, in accordance with this embodiment, the lower end of the cylindrical portion 11 is closed by means of a cap layer 18 of the soft resin material extending from the outer layer 17. The cap layer 18 has a central hollow projection 18' having a substantially U-shaped cross sectional profile. The cylindrical portion 11 has an inner diameter which is smaller than the outer diameter of the shaft portion 16 of the pin 14.

Figure 5:
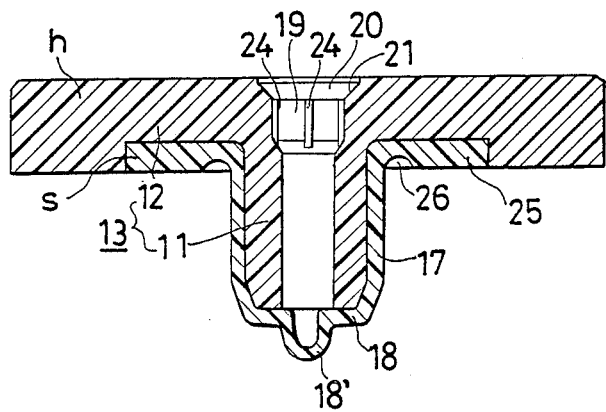
FIG. 5 is a sectional view taken along line V—V in FIG. 3.
Figure 6:
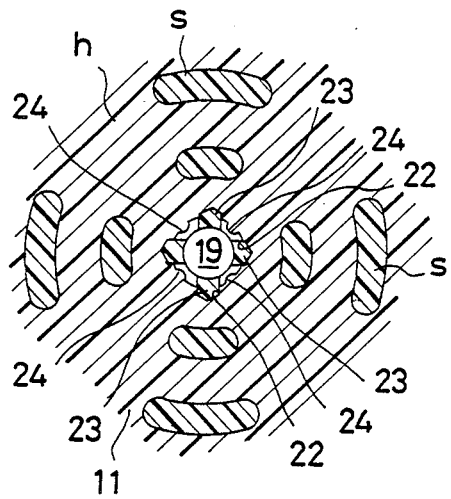
FIG. 6 is a sectional view taken along line VI—VI in FIG. 2.
Figure 7:
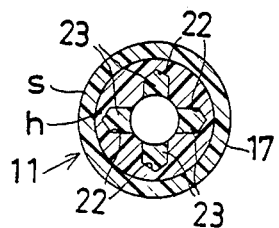
FIG. 7 is a sectional view taken along line VII—VII in FIG. 2.
Figure 9:
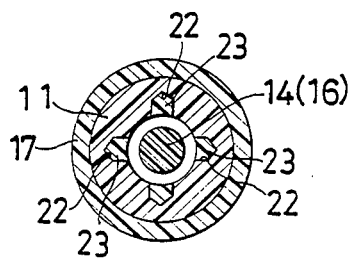
FIG. 9 is a sectional view taken along line IX—IX in FIG. 1.

The flange portion 12 has a central hole 19 communicating with the interior hollow portion of the cylindrical portion 11. The hole 19 has an upper large-diameter portion 20, within which the head portion 15 of the pin 14 can be fitted. The bottom of the large-diameter portion 20 has substantially the same diameter as the outer diameter of the shaft portion 16 of the pin 14. In other words, the large-diameter portion 20 has a downwardly tapered surface 21 terminating in the inner periphery of the hole 19 of the hollow cylindrical portion 11. The inner periphery of the flange portion 12 and cylindrical portion 11 are formed with a plurality of circumferentially spaced-apart longitudinal grooves 22. The longitudinal grooves 22 are filled with filler 23 consisting of the soft resin material s so that the inner diameter of the flange portion 12 and cylindrical portion 11 can be readily increased. The inner periphery of the flange portion 12 has radially inwardly projecting ribs 24 provided between adjacent longitudinal grooves 22 as best seen in FIG. 5. These ribs 24 make the hole 19 of the flange portion 12 slightly smaller so that the inner diameter of the hole 19 will increase slightly when the shaft portion 16 of the pin 14 is inserted into the hole 19. The flange portion 12 has a bottom layer 25 consisting of the soft resin material s. The bottom layer 35 surrounds the stem portion of the cylindrical portion 11 and is united to the outer layer 17 of the cylindrical portion 11 consisting of the soft resin material s. An annular groove 26 is formed between the bottom layer 25 and outer layer 17.

Two panels 27 and 28 to be fastened together are preliminarily formed with respective holes 29 and 30, through which the cylindrical portion 11 of the rivet body 13 is to be inserted, as shown in FIG. 8. It is desired to have the rivet body 13 and pin 14 partially united prior to insertion of the rivet assembly into the panel holes 29 and 30 by slightly inserting the shaft portion 16 of the pin 14 through the hole 19 of the flange portion 12 of the rivet body 13. When the pin 14 is inserted into the rivet body 13, the shaft portion 16 of the pin 14 engages with the ribs 24 defined upon the interior surface of the hole 19 of the flange portion 12 so as to slightly increase the inner diameter thereof. The pin 14 is thus temporarily retained within the hole 19 of the flange portion 12 by means of the restoring forces of the ribs 24 and the soft resin material.

In order to fasten together the two panels 27 and 28 with the rivet 10 consisting of the rivet body 13 and pin 14, the holes 29 and 30 of the two panels 27 and 28 are aligned, as shown in FIG. 8, then the cylindrical portion 11 of the rivet body 13 is inserted through the holes 29 and 30, and then the shaft portion 16 of the pin 14 is inserted into the cylindrical portion 11 of the rivet body 13.

As the shaft portion 16 of the pin 14 is inserted into the cylindrical portion 11 of the rivet body, its end engages the tapered surface 21 of the hole 19, so that it is advanced while gradually increasing the inner diameter of the cylindrical portion 11. When the shaft portion 16 is inserted still further until the top of the head portion 15 of the pin 14 is flush with the top of the flange portion 12, the cylindrical portion 11 is expanded radially outwardly at the lower end thereof beneath the panel 28, as shown in FIG. 1, thus clamping the two panels 27 and 28 in an overlapped state between such expanded portion and the bottom surface of the flange portion 12.

At this time, the outer layer 17 of the cylindrical portion 11 consisting of the soft resin material s is held in close contact with the interior surfaces of the holes 29 and 30 of the panels 27 and 28, and also the bottom layer 25 of the flange portion 12 consisting of the soft resin material s is held in close contact with the upper surface of the panel 27, so that it is possible to obtain a reliable sealing effect.

In the meantime, as the cylindrical portion 11 is expanded, the cap layer 18 consisting of the soft resin material s is also expanded radially outwardly. Consequently, the hollow projection 18' is expanded so as to attain a substantially flattened state, resulting in its plastic deformation. Subsequently, it maintains the deformed state, so that it is possible to prevent subsequent contraction of the cylindrical portion 11 due to the elastic restoring force of the soft resin material s.

More specifically, when the cylindrical portion 11 is expanded, an elastic restoring force is produced within the soft resin material s, and it acts as a force tending to cause contraction of the cylindrical portion 11. Such contracting force may act upon the pin 14 in the direction of withdrawal thereof or cause contraction of the outer layer 17 of the cylindrical portion 11 so as to degrade the sealing property thereof with respect to the surfaces of the holes 29 and 30 of the panels 27 and 28. The plastic deformation of the hollow projection 18' of the cylindrical portion 11 is thus used to prevent the contraction of the cylindrical portion 11 so as to prevent unintended withdrawal of the pin 14 or deterioration of the sealing property of the rivet.

The shape and material of the rivet body 13 and pin 14 are not limited to those in the above embodiment.

As has been described in the foregoing, according to the invention the rivet body 13 has a double-layer structure constituted by means of relatively hard and soft resin materials, with the outer layer 17 of the cylindrical portion 11 made of the soft resin material. Therefore, when the cylindrical portion 11 is expanded, the outer layer 17 of the cylindrical portion 11 is uniformly expanded so as to be held in close contact with the interior surfaces of the holes 29 and 30 of the panels 27 and 28, so that a highly reliable sealing effect can be obtained. Furthermore, since the end opening of the cylindrical portion 11 is closed at least by means of the soft resin material, with the spreading expansion of the cylindrical portion 11, the soft resin material that closes the end opening of the cylindrical portion 11 is likewise expanded radially outwardly so as to result in plastic deformation thereof, so that subsequent contraction of the cylindrical portion 11 can be effectively prevented. This means that it is possible to prevent withdrawal of the pin 14 or deterioration of the annular sealing property due to otherwise possible contraction of the cylindrical portion 11.

Obviously, many modifications and variations of the present invention are possible in light of the above teachings. It is therefore to be understood that within the scope of the appended claims, the present invention may be practiced otherwise than as specifically described herein.

What is claimed is:

1. A synthetic resin rivet for disposition within an aperture defined within a panel, comprising:

a rivet body having a hollow cylindrical portion and an integral flange portion extending radially outwardly from the upper end of said cylindrical portion for engaging a surface of said panel when said rivet is disposed within said panel aperture; and a pin for spreading hollow cylindrical portion of said rivet body when inserted thereinto, said rivet body having a double-layer structure constituted by hard and soft synthetic resins, with at least an outer layer of said hollow cylindrical portion of said rivet body comprising said soft synthetic resin and an inner layer of said hollow cylindrical portion of said rivet body comprising said hard synthetic resin for uniformly radially expanding said outer soft synthetic resin into sealing engagement with sidewall portions of said aperture defined within said panel when said pin is inserted into said hollow cylindrical portion of said rivet body; and an expansible, plastically deformable, substantially U-shaped cap member integrally formed upon the lower end of said hollow cylindrical portion of said rivet body for closing the lower end opening of said hollow cylindrical portion of said rivet body and being constituted of said soft synthetic resin for counteracting contractual tendencies of said soft synthetic resin outer layer of said hollow cylindrical portion of said rivet body away from said sidewall portions of said aperture defined within said panel in order to maintain said sealing engagement thereof by substantially flattening out from said U-shaped configuration when said hollow cylindrical portion of said rivet body is radially expanded as a result of said insertion of said pin into said hollow cylindrical portion of said rivet body.

2. The synthetic resin rivet according to claim 1, wherein:

said hard synthetic resin is one of polyacetal, nylon, and polypropylene materials.

3. The synthetic resin rivet according to claim 1, wherein said soft synthetic resin is polyurethane.

4. A synthetic resin rivet as set forth in claim 1, wherein:

said flange portion of said rivet body comprises a radially outer portion fabricated of said hard synthetic resin, and a radially inner portion, integrally formed with said outer layer of said hollow cylindrical portion of said rivet body, fabricated of said soft synthetic resin.

5. A synthetic resin rivet as set forth in claim 1, wherein:

said hollow cylindrical portion of said rivet body comprises a triple-layer structure with the innermost and outermost layers formed from said soft synthetic resin, and an intermediate layer, interposed between said innermost and outermost soft synthetic resin layers, being formed of said hard synthetic resin.

* * * * *